United States Patent
Salzman

(10) Patent No.: US 8,141,519 B2
(45) Date of Patent: Mar. 27, 2012

(54) ANIMAL ENCLOSURE

(75) Inventor: Brett Allen Salzman, West Hollywood, CA (US)

(73) Assignee: BrightSpot Solutions, LLC, Longmont, CO (US)

( * ) Notice: Subject to any disclaimer, the term of this patent is extended or adjusted under 35 U.S.C. 154(b) by 534 days.

(21) Appl. No.: 12/170,013

(22) Filed: Jul. 9, 2008

(65) Prior Publication Data

US 2010/0006037 A1     Jan. 14, 2010

(51) Int. Cl.
*A01K 1/03* (2006.01)
(52) U.S. Cl. .................. 119/484; 119/706; 119/482
(58) Field of Classification Search ........... 119/706, 119/484, 482; 248/317
See application file for complete search history.

(56) References Cited

U.S. PATENT DOCUMENTS

| | | | |
|---|---|---|---|
| 2,373,730 A * | 4/1945 | Williamson et al. ...... 229/125.26 |
| 4,013,254 A * | 3/1977 | Boundy et al. ................. 248/243 |
| 4,520,758 A | 6/1985 | Pfriender |
| 4,949,483 A * | 8/1990 | Dobson et al. .................. 40/740 |
| 4,986,217 A * | 1/1991 | Robinson et al. ............. 119/168 |
| D322,494 S * | 12/1991 | Reynolds ..................... D30/158 |
| 5,655,479 A * | 8/1997 | Armington et al. ........... 119/168 |
| 5,730,084 A | 3/1998 | Kacic |
| 5,765,504 A * | 6/1998 | Evans et al. .................... 119/168 |
| 6,205,955 B1 * | 3/2001 | Diep .............................. 119/706 |
| 6,209,491 B1 | 4/2001 | Olson |
| 6,487,990 B1 * | 12/2002 | McNew ........................ 119/168 |
| 7,011,043 B2 | 3/2006 | Diep |
| 7,111,743 B1 * | 9/2006 | Moss et al. ....................... 211/72 |
| 7,284,502 B1 * | 10/2007 | Dotter ........................... 119/484 |
| 7,322,315 B2 * | 1/2008 | Brewer et al. ................. 119/498 |
| 2001/0045191 A1 * | 11/2001 | Gear .............................. 119/706 |
| 2002/0189549 A1 * | 12/2002 | Writer et al. .................. 119/706 |
| 2006/0102092 A1 * | 5/2006 | Cortez .......................... 119/498 |
| 2006/0112898 A1 | 6/2006 | Fjelstad et al. |
| 2006/0137622 A1 | 6/2006 | Lamstein |
| 2006/0137623 A1 * | 6/2006 | Lamstein ...................... 119/706 |
| 2006/0191490 A1 * | 8/2006 | Lamstein et al. ............. 119/706 |
| 2006/0201437 A1 | 9/2006 | Ryan |
| 2007/0240647 A1 * | 10/2007 | Dietz ............................. 119/482 |
| 2008/0149041 A1 * | 6/2008 | Lamstein et al. ............. 119/706 |

* cited by examiner

*Primary Examiner* — Joshua J Michener
*Assistant Examiner* — Justin Benedik
(74) *Attorney, Agent, or Firm* — Maxey Law Offices, PLLC; Stephen Lewellyn

(57) ABSTRACT

An animal enclosure is provided which is particularly adapted for cat. The animal enclosure includes a housing having a base, a sidewall extending upwardly from the perimeter of the base, a hollow interior space surrounded by the sidewall, an access opening in the sidewall to permit an animal to enter and leave the hollow interior space. A frame is attached to an interior surface of said sidewall, and a corrugated bundle is removably retained by the frame. The animal enclosure is collapsible and is capable of being shipped and stored in a compact configuration but which is capable of being erected on site to create an animal enclosure.

10 Claims, 8 Drawing Sheets

ANIMAL ENCLOSURE

BACKGROUND OF THE INVENTION

1. Field of the Invention

The present invention relates generally to animal enclosures, and more particularly, relating to an animal enclosure for cats containing a claw scratching device, and further related to a collapsible animal enclosure device which is capable of being shipped and stored in a compact configuration but which is capable of being erected on site to create an animal enclosure housing including a claw scratching device.

2. Description of the Related Art

Structures exist that provide a house or entertainment device for cats that not only include sleeping quarters for the cat but also are designed to satisfy other natural habits for the animal, and may include scratching posts or other devices for sharpening of the claws and exercise. The most common of such structures, which is commonly referred to as a "cat condo", provides numerous tiered hiding and resting areas that are typically covered in a carpet material for scratching. Another structure includes a house having sleeping quarters and a texture, such as sand paper applied to an exterior facing wall providing a scratching post.

While the devices heretofore fulfill their respective, particular objectives and requirements, they seem to have one or more drawbacks, such as being bulky, not readily portable, expensive to manufacture and ship, unsightly in appearance, and do not contain debris created as a result of a cat scratching the post. As such the animal enclosure according to the present invention substantially departs from the concepts and designs of the prior art, and in doing so provides an apparatus which overcomes one or more of the drawback now present in the art.

SUMMARY OF THE INVENTION

In general, in one aspect, an animal enclosure is provided. The animal enclosure includes a housing having a base, a sidewall extending upwardly from the perimeter of the base defining a hollow interior space surrounded by the sidewall, an access opening in the sidewall to permit an animal to enter and leave the hollow interior space, a frame attached to an interior surface of said sidewall, and a scratching pad removably retained by said frame.

In general, in another aspect, the frame is removably attached to the interior surface the sidewall, and may include a cooperating coupling for attaching the frame.

In general, in another aspect, the cooperating coupling includes a first pair of spaced tabs extending from a first side of the frame, a second pair of spaced tabs extend from a second side of the frame, a first and a second slot through the sidewall for receiving the first pair of spaced tabs, a third and a forth slot through the sidewall for receiving the second pair of spaced tabs, and wherein the first and the second pair of tabs are bendable after being inserted through the slots to prevent withdrawal from the slots, thereby securing the frame to the interior surface of the housing.

In general, in another aspect, the frame includes a front panel, a plurality of end walls extending rearwardly from the front panel, an interior receiving space, and an opening in the front panel having a peripheral edge at a spaced distance inward of the perimeter of the front panel, and wherein the scratching pad is removably inserted into the interior receiving space through an opening in one of the plurality of end walls.

In general, in another aspect, the animal enclosure the scratching pad is a corrugated bundle.

In general, in yet another aspect, an animal enclosure is provided. The animal enclosure includes a housing having a base, an open top, a sidewall extending upwardly from the perimeter of said base and terminating at said open top, the sidewall defining a hollow interior space surrounded by the sidewall, an access opening in the sidewall to permit an animal to enter and leave the hollow interior space, a frame removably attachable to an interior surface of the sidewall, the frame having a front panel, a plurality of end walls extending rearwardly from the front panel, an interior receiving space, an opening in the front panel having a peripheral edge at a spaced distance inward of the perimeter of the front panel, a corrugated bundle removably insertable into the interior receiving space through an opening in one of the plurality of end walls, and a cover removably covering the open top of the housing.

With the forgoing in mind, it is an object of the invention to provide an animal enclosure that includes a claw scratching device contained within the enclosure.

It is another object of the invention to provide a collapsible animal enclosure which is capable of being shipped and stored in a compact configuration but which is capable of being erected on site to create an animal enclosure.

It is another object of the invention to provide an animal enclosure that includes a claw scratching device where debris creates from a cat scratching the device is contained by the animal enclosure.

It is another object of the invention to provide an animal enclosure with a claw scratching device that mimics their natural scratching position and also allows cats to tone and stretch their muscles and ligaments.

It is another object of the invention to provide an animal enclosure having an interior space in which a cat can feel secure.

It is another object of the invention to provide an animal enclosure having cat scratching device with a replaceable corrugated bundle.

There has thus been outlined, rather broadly, the more important features of the invention in order that the detailed description thereof that follows may be better understood and in order that the present contribution to the art may be better appreciated.

Numerous other objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
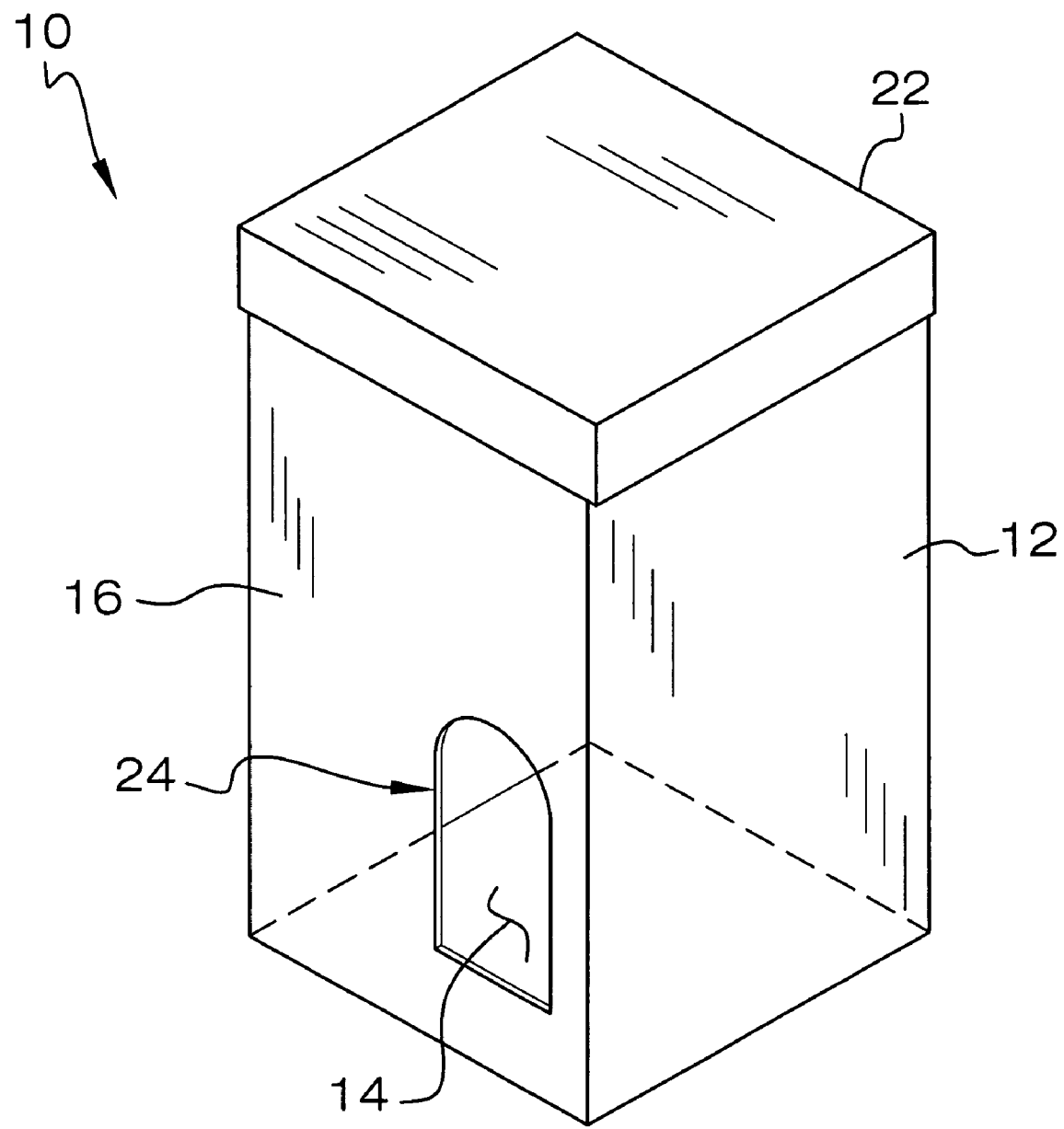
FIG. 1 is a diagrammatic front perspective view of the animal enclosure constructed in accordance with the principles of the present invention, shown in an erected configuration for use.

Referring now to the drawings, the animal enclosure of the present invention is generally referred to by reference numeral 10.

Figure 2:
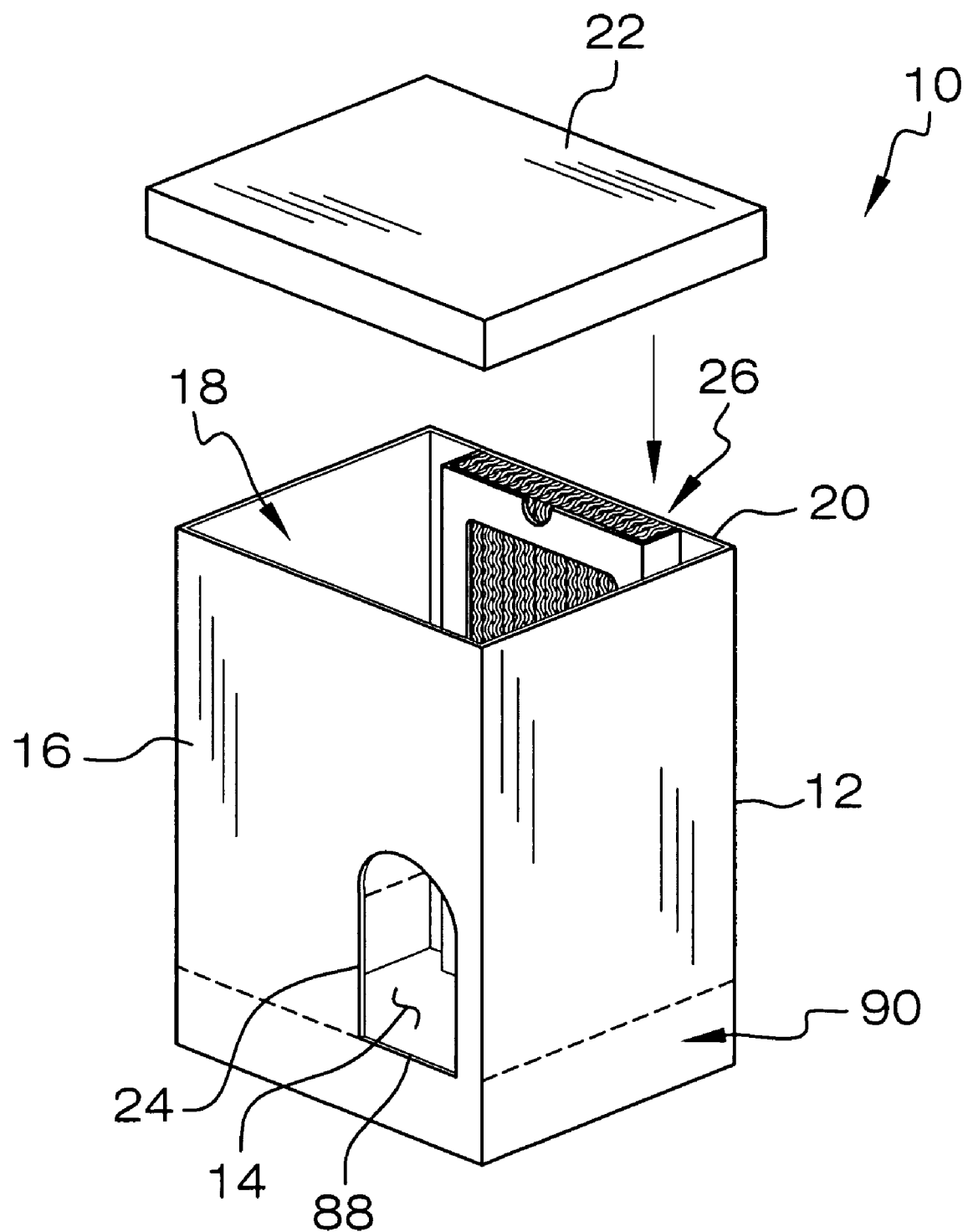
FIG. 2 is a diagrammatic front perspective view of the animal enclosure with the cover removed and partially showing the interior space and the scratching.

As shown, the enclosure 10 includes a housing 12 having a base 14 and a sidewall 16 extending upwardly from the perimeter of the base creating a hollow interior space 18 that is surrounded by the sidewall. The top 20 of the housing 12 may be open and a removable cover 22 can be provided for covering the top 20, as shown in FIG. 2. The sidewall 16 has an access opening 24 permitting an animal to enter and leave the interior space 18.

A claw scratching device 26 is positioned within the interior space 18 for use by the animal, such as a cat, when it desires to clean, remove the outer layers of the claws or otherwise sharpen its claws. The scratching device 26 comprises a frame 28 attached to an interior surface 30 of the sidewall 16, and a scratching pad 32 removably retained by the frame. The scratching pad 32 provides the surface for the cat to scratch, and may be replaced when worn by removing it from the frame and inserting a new one in its place. It is contemplated the scratching pad 32, may comprise a section of fabric or other cloth material, carpet or the like. In the preferred embodiment, a corrugated bundle provides the scratching pad 32. The corrugated bundle 32 comprises a plurality of strips of corrugated material arranged side-by-side with ends of each strip forming front and rear surfaces. An example of such a corrugated bundle is described in U.S. Pat. No. 7,011,043, there entirety of which is incorporated herein by reference.

The housing 12 is of a height sufficient to permit a cat in the interior space 18 to vertically stretch to scratch the scratching device 26. In this regard, the housing 12 may be vertically elongated having a height great than its width.

Figure 4:
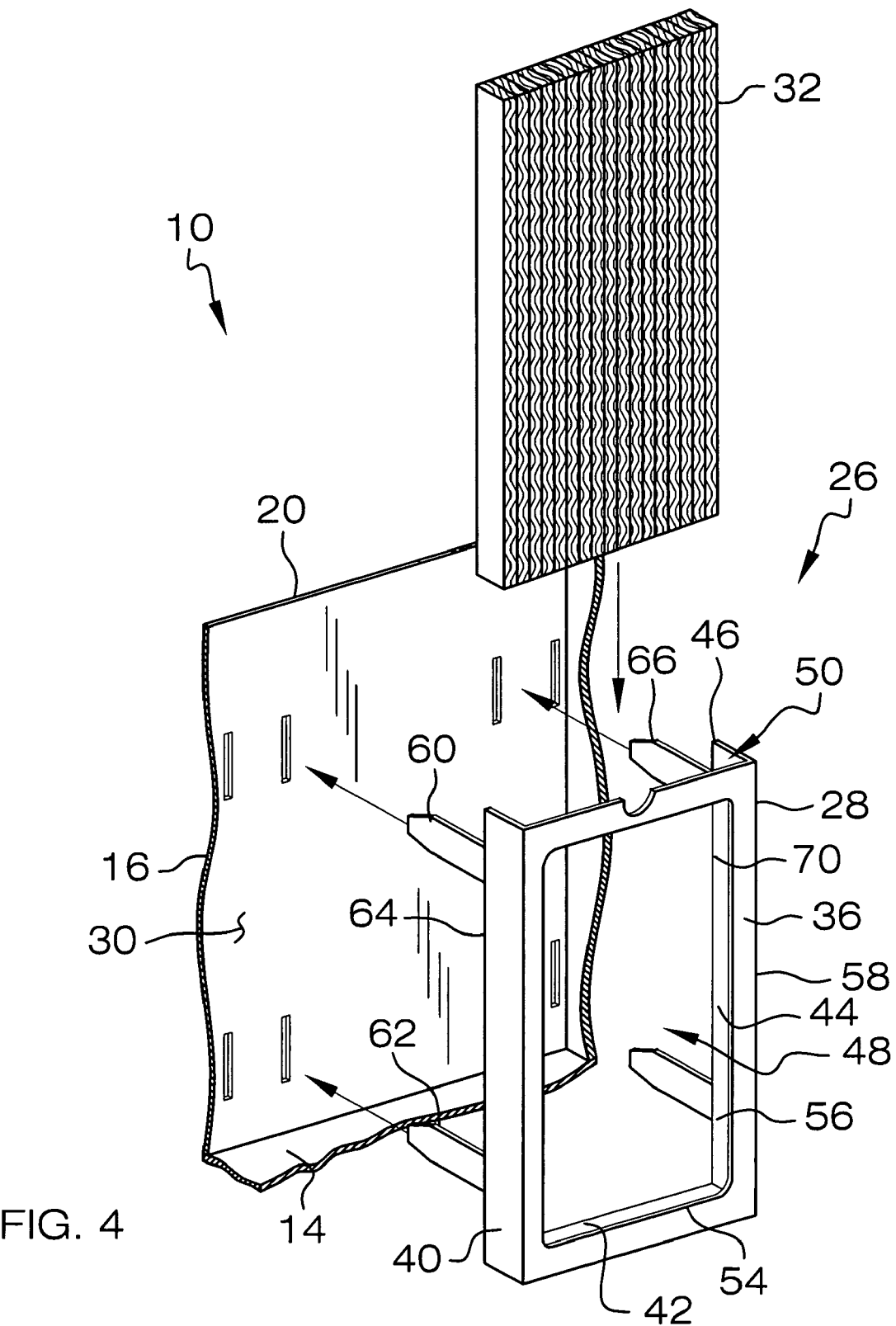
FIG. 4 is a partial perspective view of the interior surface of the sidewall with the frame of the scratching device exploded from the sidewall and the corrugated bundled removed from the frame.

With reference to FIG. 4, the frame 28 comprises a front panel 36, a sidewall comprised of a plurality of end walls 40-46 extending rearwardly from front panel, and an interior receiving space 48 defined and surrounded by the front panel and the plurality of end wall. The corrugated bundle 32 is removably inserted into the interior receiving space 48 through an opening 50 in one of the plurality of end walls 40-46. The scratching surface 52 is accessible through a second opening 54 in the front panel 36 and includes a peripheral edge 56 at a spaced distance inward of the perimeter 58 of said front panel. The peripheral edge 56 overlaps the edges of the corrugated bundle 32 thereby retaining it from falling through the second opening 54.

The frame 28 is attached the sidewall 16 at an interior surface 30 such that the front panel 36 is parallel and disposed at a spaced distance from the interior surface. The frame 28 may be removably attached to the interior surface 30 by a cooperating coupling 34 which operates to secure the frame to the sidewall. The cooperating coupling 34 may be in the form of a hook-and-loop fasteners, snap fasteners or the like.

Figure 5:
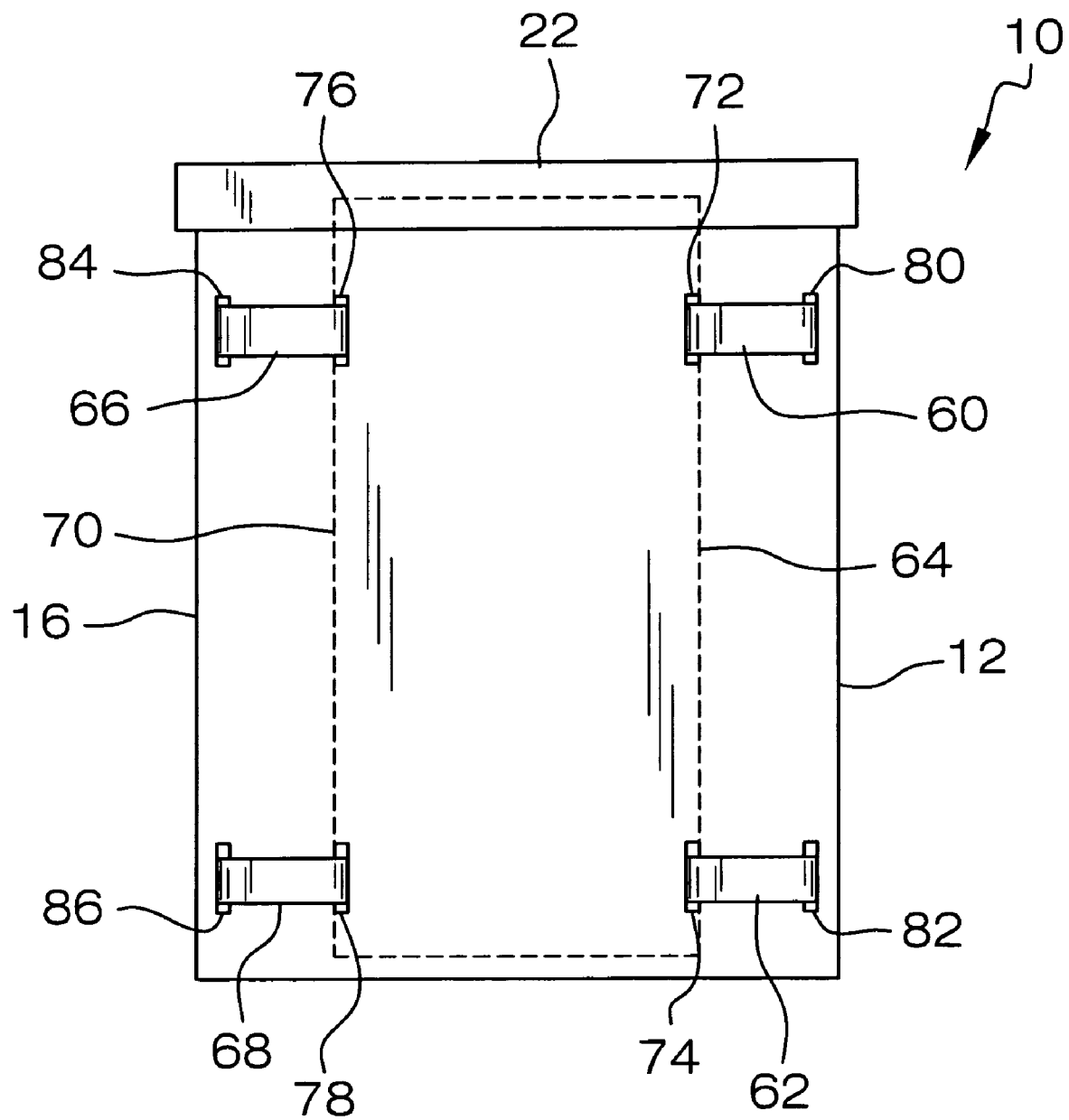
FIG. 5 is a rear elevation view of the animal enclosure showing the surface opposite of the interior surface of the sidewall to which the scratching device is attached.

In a preferred embodiment, as shown in FIGS. 4 and 5 the cooperating coupling 34 includes a first pair of tabs comprising tabs 60 and 62 which extending from a first vertical side 64 of the frame 28 in a direction rearward and normal to the front panel 36. The tabs 60 and 62 are disposed in a spaced relation along the vertical side 64. A second pair of tabs comprising tabs 66 and 68 extend from a second vertical side 70 of the frame which is opposed to the first vertical side 64 in a direction rearward and normal to the front panel 36. Tabs 60 and 66 may be disposed at the same elevation and tabs 62 and 68 may also be disposed at the same elevation. Tabs 60 and 62 are insertable through corresponding slots 72 and 74 through the sidewall 16 respectively. Tabs 66 and 68 are insertable through corresponding slots 76 and 78 through the sidewall 16 respectively. The tabs are bendable such that once inserted through the slots from within the interior space 18 they are each bent over so as to prevent withdrawal of the tabs from the slots, thereby securing the frame 28 to the interior surface 30 of the sidewall 16.

Additionally, to further secure the frame 18, tabs 60 and 62 may be inserted back through the sidewall 16 by insertion through slots 80 and 82 respectively, and tabs 66 and 68 may also be inserted back through the sidewall by insertion through slots 84 and 86 respectively, as shown in FIG. 5.

Tabs 60-68 may taper from wide to narrow in a direction away from the frame to facilitate the inserting of the tabs into the slots. Further, the wide portions of the tabs 60-68 may be of a first width, and the slots 72-86 may be of a second width. The first width may be equal to or slightly greater than the second width to cause a frictional engagement between the tabs 60-68 and the slots 72-86.

Figure 3:
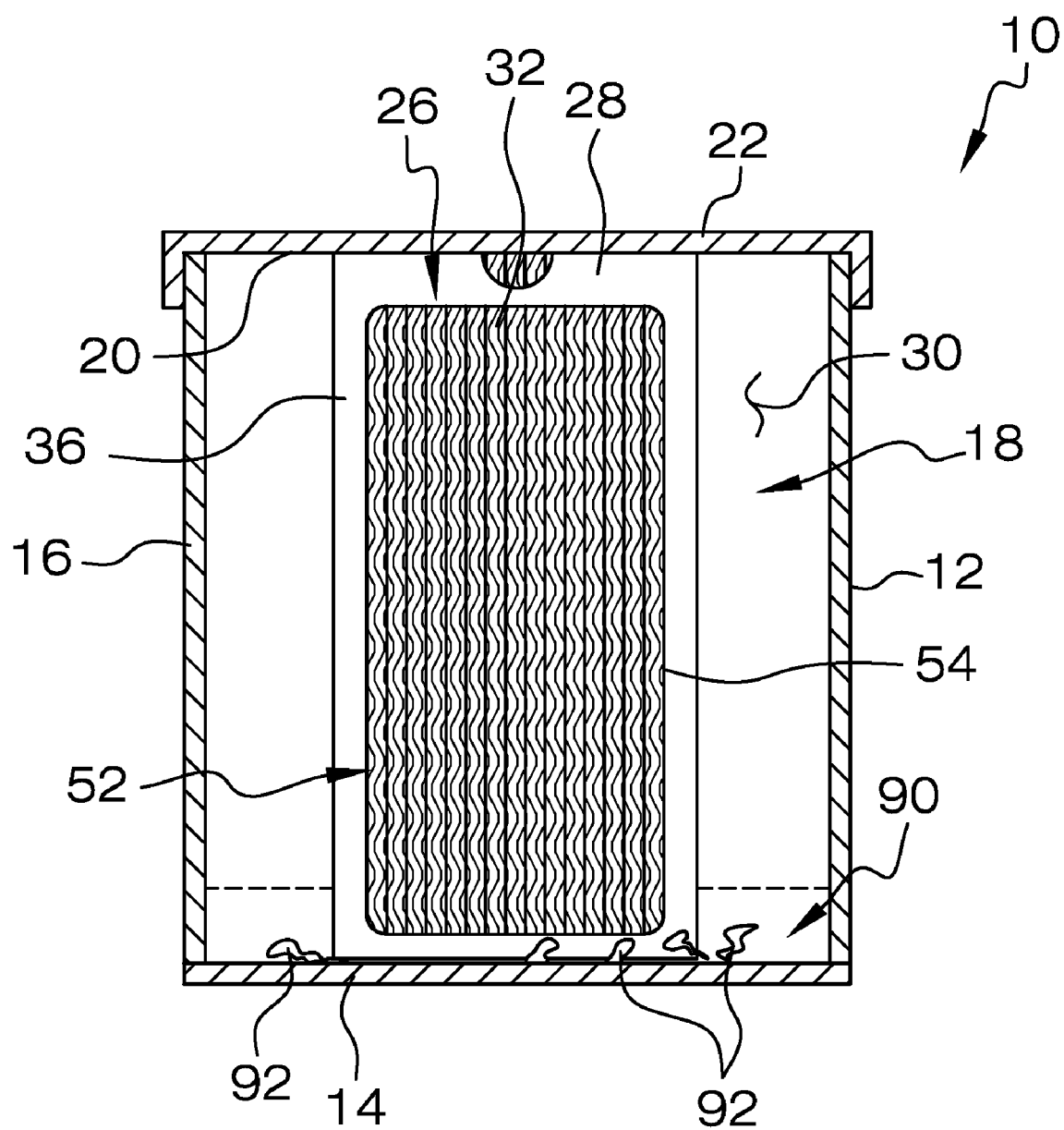
FIG. 3 is a side cross sectional view taken along line 3-3 in FIG. 1 showing a front elevation the scratching device attached to the interior surface of the sidewall.

The scratching device 26 may be of a height such that it extends the height of the sidewall 16 from about the base 14 to about the top 20, as shown in FIG. 3, thereby allowing a cat to full stretch out when scratching.

Additionally, the bottom edge 88 of the access opening 24 may be elevated above the base 14, as shown in FIG. 3, so as to form a tray region 90 at a lower portion of the housing 12 to capture and retain debris 92 created by the cat scratching the corrugated bundle 32.

Figure 6:
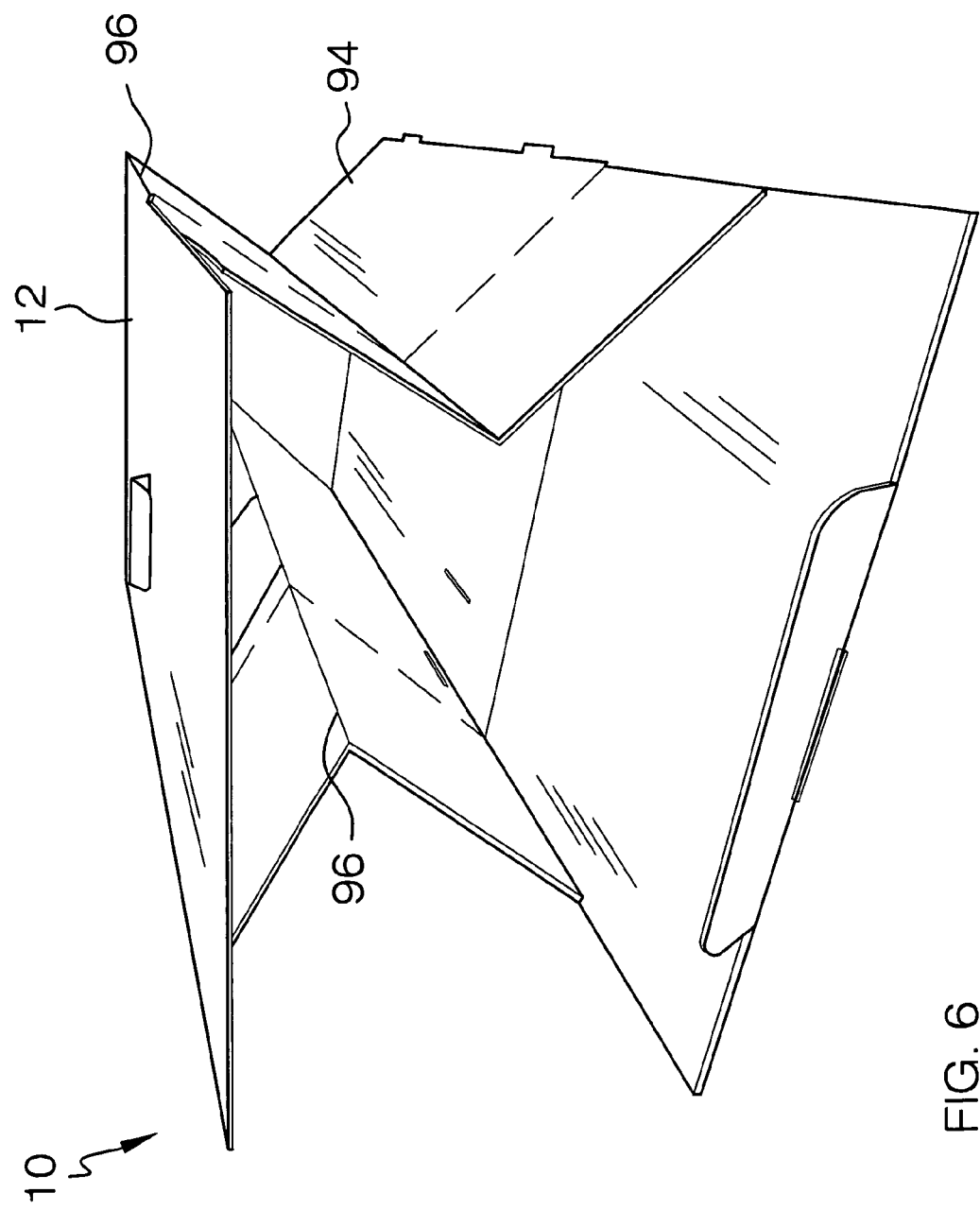
FIG. 6 is perspective view of the housing shown in a partially collapsed configuration illustrating the arrangement of being formed of unitary a piece of material having fold lines permitting the unitary piece of material to be folded in the desired final configuration.

With reference to FIG. 6, the housing is shown in a semi-collapsed configuration. The housing 12 may be unitary and formed of a single piece of substantially rigid or self-supporting material 94 with appropriate fold lines 96 being provided either by areas of weakening or by less rigid material at the location of the fold lines or by appropriate hinges to permit folding. In one form, it is contemplated the housing 12 may be formed by 7 separate panels folded into a four sided figure with a closed base 14 and an open top 20, as best shown in FIG. 2.

It is contemplated to provide appropriate areas of weakening for the fold lines 96 and to divide the material 94 into a serial arrangement of panels separated by the fold lines and to provide one or more coupling flaps along one or more free edges of the panels for engagement with receiving slots in the free edge of the panel at the other end of the serial arrangement. Housing 12 is erected by folding the panels about the fold lines and directing the one or more flaps into the receiving slots to complete the housing.

Figure 7:
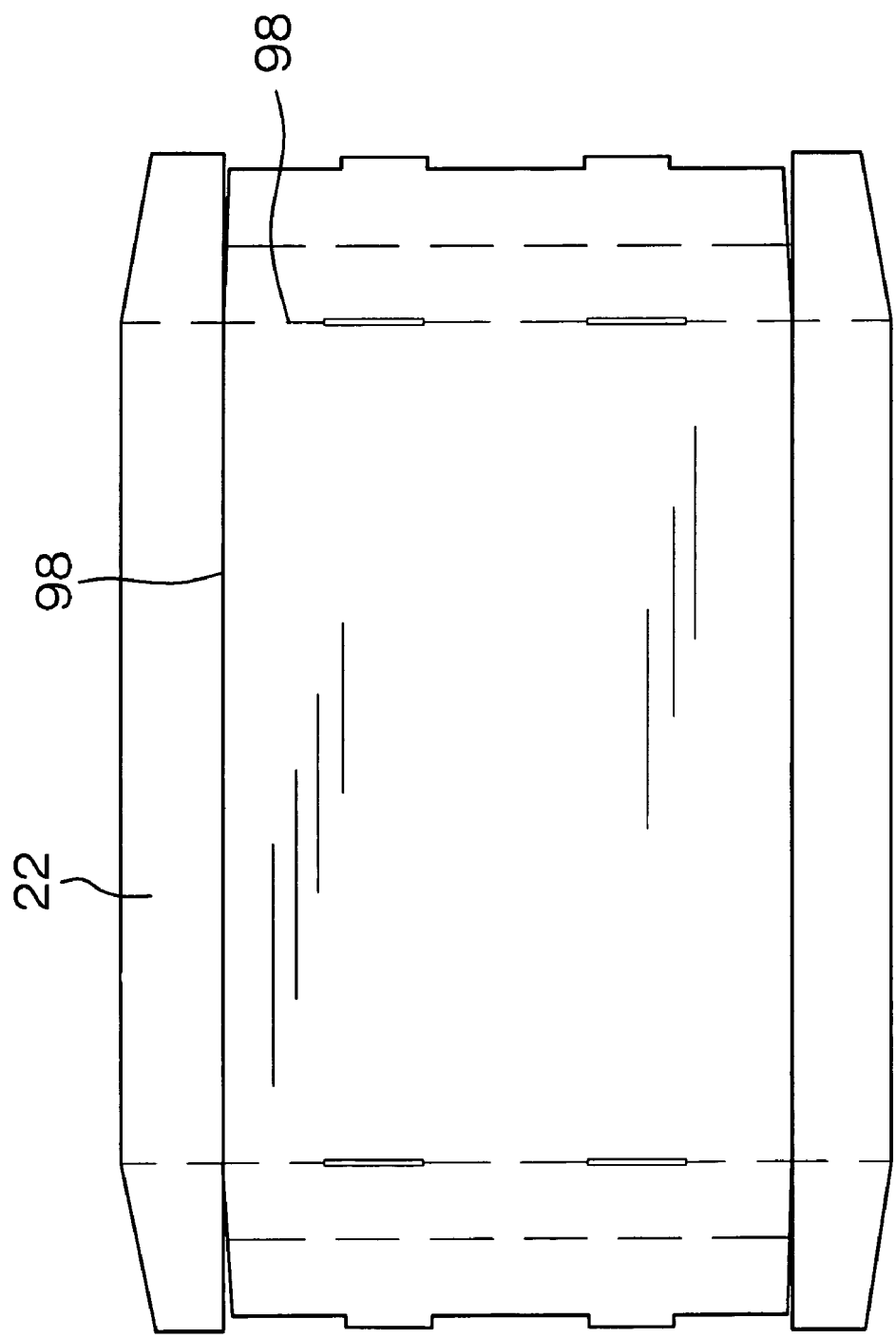
FIG. 7 is plan view of the cover shown in a partially collapsed configuration illustrating the arrangement of being formed of unitary a piece of material having fold lines permitting the unitary piece of material to be folded in the desired final configuration.

Additionally, as shown in FIG. 7, the cover 22 can be formed of a single piece of rigid or semi-rigid or rigid self-supporting material cut from a single sheet of material and folded about suitable fold lines into the desired final configuration.

Figure 8:
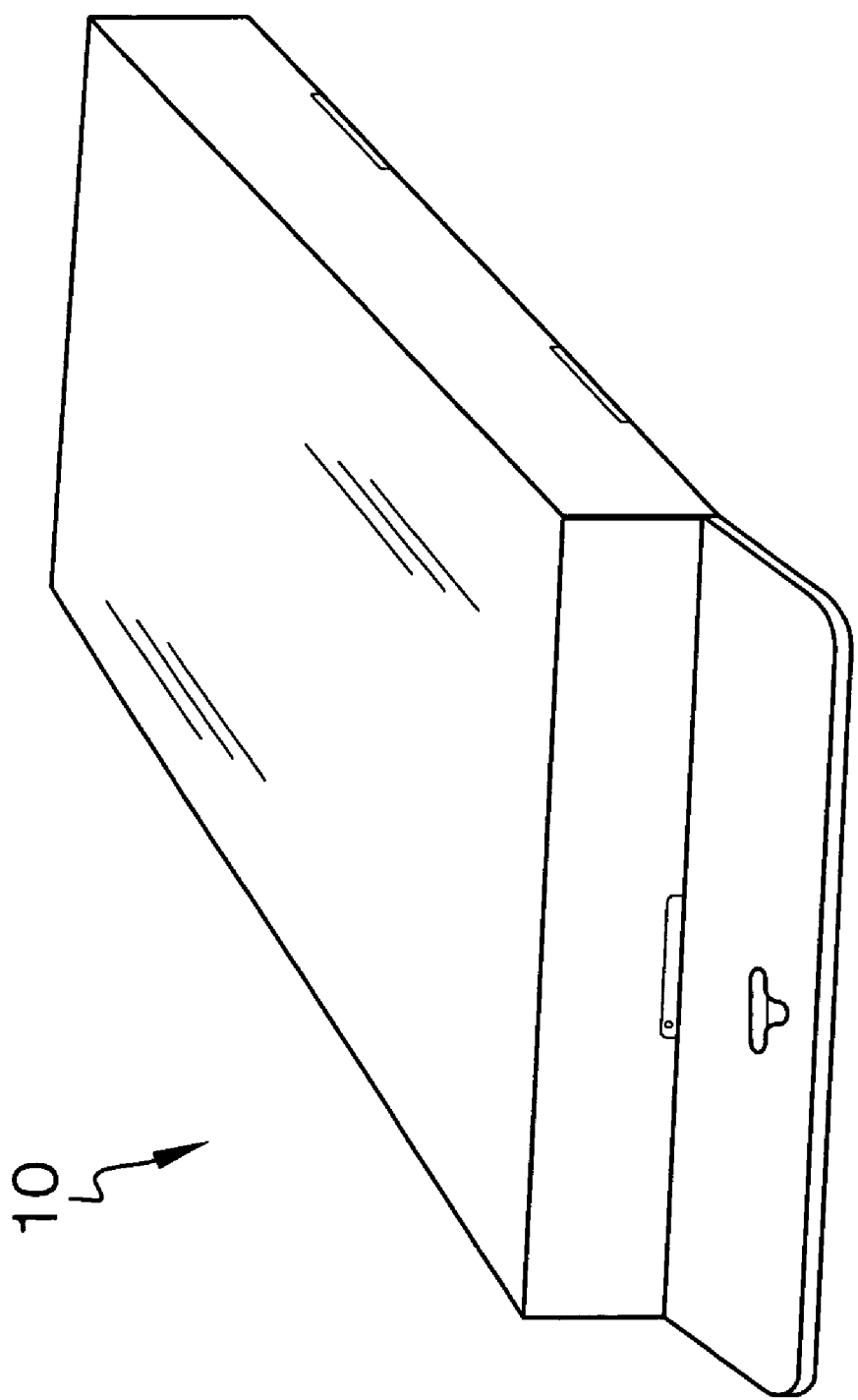
FIG. 8 is a diagrammatic perspective view of the animal enclosure in a collapsed configuration suitable for storing and shipping.

In FIG. 8, the enclosure 10 is shown in a compact configuration for storing and shipping a but which is capable of being erected on site to create the various components of animal enclosure.

A number of embodiments of the present invention have been described. Nevertheless, it will be understood that various modifications may be made without departing from the spirit and scope of the invention. Accordingly, other embodiments are within the scope of the following claims.

I claim:

1. An animal enclosure, comprising:
a housing having a closed base, an open top, a hollow interior space surrounded by a sidewall, and an access opening in said sidewall to permit an animal to enter and leave the hollow interior space, a bottom edge of said access opening being elevated above said closed base so as to form a tray region at a lower portion of said housing, said sidewall having an interior surface;
a frame having a front panel having an opening therethrough, a sidewall extending rearwardly from the perimeter of said front panel, an open back opposite of said front panel, and a sidewall opening through said sidewall, said sidewall and said front panel defining a receiving space for receiving a scratching pad;
said frame attached to said interior surface of said sidewall of said housing with said front panel spaced from said interior surface of said sidewall, and said sidewall opening facing said open top of said housing; and
a scratching pad disposed in said receiving space of said frame and between said interior surface of said housing sidewall and said front panel of said frame, said scratching pad being accessible for scratching through said opening in said front panel, and wherein said scratching pad is a corrugated bundle including a plurality of strips of corrugated material arranged side-by-side.

2. The animal enclosure of claim 1, wherein said frame vertically extends from the closed base of said housing to the open top of said housing.

3. The animal enclosure of claim 2, further comprising:
a cooperating coupling, said cooperating coupling removably attaching said frame to said interior surface of said housing.

4. The animal enclosure of claim 3, wherein said cooperating coupling includes:
a first pair of spaced tabs extending rearwardly from a first vertical side of said frame, said first pair of spaced tabs extending through first and second slots, respectively, in said sidewall of said housing and being bent to prevent withdrawal therefrom; and
a second pair of spaced tabs extend from a second vertical side of said frame, said second pair of spaced tabs extending through third and fourth slots, respectively, in said sidewall of said housing and being bent to prevent withdrawal therefrom.

5. The animal enclosure of claim 4, wherein said first pair of tabs extend from said sidewall of said frame, and wherein said second pair of tabs extend from said sidewall of said frame.

6. The animal enclosure of claim 5, wherein said sidewall of said frame is contiguous with said interior surface of said sidewall of said housing.

7. The animal enclosure of claim 1, wherein said housing is unitary and formed of a single piece of substantially rigid or self-supporting material.

8. An animal enclosure, comprising:
a housing formed of a single piece of self-supporting material including panels defined by fold lines that is storable in a collapsed configuration and erectable into a figure having a four sided sidewall, a closed base, an open top, a hollow interior space surrounded by said sidewall, and an access opening in said sidewall to permit an animal to enter and leave the hollow interior space, a bottom edge of said access opening being elevated above said closed base so as to form a tray region at a lower portion of said housing;
a cover formed of a single piece of self-supporting material including fold lines about which the material is foldable to form said cover into a desired configuration;
a rectangular frame having a front panel having an opening therethrough, a sidewall extending rearwardly from the perimeter of said front panel and about at least three sides of said front panel, an open back opposite of said front panel, and a sidewall opening extending along a fourth side of said front panel, said sidewall and said front panel defining a receiving space for receiving a scratching pad;
said rectangular frame attached to an interior surface of said sidewall of said housing with said front panel spaced from said interior surface of said sidewall and said sidewall opening facing said open top of said housing;
a scratching pad disposed in said receiving space of said rectangular frame and between said interior surface of said housing sidewall and said front panel of said rectangular frame, said scratching pad being accessible for scratching through said opening in said front panel, and wherein said scratching pad is a corrugated bundle including a plurality of strips of corrugated material arranged side-by-side; and
wherein said frame vertically extends from the closed base of said housing to the open top of said housing.

9. The animal enclosure of claim 8, further comprising:
a cooperating coupling, said cooperating coupling removably attaching said frame to said interior surface of said housing.

10. The animal enclosure of claim 9, wherein said cooperating coupling includes:

a first pair of spaced tabs extending rearwardly from a first vertical side of said frame, said first pair of spaced tabs extending through first and second slots, respectively, in said sidewall of said housing and being bent to prevent withdrawal therefrom; and a second pair of spaced tabs extend from a second vertical side of said frame, said second pair of spaced tabs extending through third and fourth slots, respectively, in said sidewall of said housing and being bent to prevent withdrawal therefrom.

* * * * *